Patented Feb. 10, 1948

2,435,769

UNITED STATES PATENT OFFICE 2,435,769

STABILIZERS FOR VINYL POLYMERS

La Verne E. Cheyney and Carl R. Parks, Akron, Ohio, assignors to Wingfoot Corporation, Akron, Ohio, a corporation of Delaware No Drawing. Application November 25, 1942, Serial No. 466,916

6 Claims. (Cl. 260—88)

This invention relates to a polymeric vinyl material which is stabilized with formamide. More particularly, it relates to the stabilization of a heated solution of the polymeric material, especially where it is heated in an iron vessel or in contact with iron or a salt thereof, such as the oxide, chloride, acetate, etc.

The class of polymeric materials to which this invention relates includes soluble polymers of vinyl chloride and copolymers of vinyl chloride with other polymerizable materials. For instance, the stabilizer of this invention may be used to stabilize a solution of polyvinyl chloride in ethylene dichloride or methyl ethyl ketone; a solution of vinyl chloride-acetate copolymer (Vinylite) in ethylene dichloride, acetone or methyl ethyl ketone; a solution of vinyl chloride-vinylidene chloride copolymer (containing over 80 per cent of vinyl chloride) in ethylene dichloride; a solution of vinyl-chloride-diethyl maleate copolymer in ethylene dichloride or benzene; a solution of vinyl chloride-diethyl fumarate copolymer in ethylene dichloride. Solutions of copolymers of vinyl chloride with diesters of maleic acid, fumaric acid, and monochloro maleic acid (in any ratio from 5 to 95 per cent of either monomer) may be stabilized according to this invention, such as copolymers with diethyl maleate, dimethyl chloromaleate, dicyclohexyl maleate, etc. Other solvents which may be used in preparing various of the solutions depending upon solubility include chlorobenzene, cyclohexanone, methylene chloride, tetrahydrofurane, dioxane, etc.

The stability of the polymers and copolymers varies from batch to batch. They are rendered less stable by the presence of air. Iron, either introduced as a contaminant in the solvent used or present in the material of which the containing vessel is made, makes the polymers and copolymers less stable. Iron salts, such as the oxide, chloride, acetate, etc., likewise render the polymers and copolymers less stable. The stabilizer of this invention stabilizes the polymers and copolymers in the presence of air or iron and its salts.

The discoloration takes place fairly rapidly in most instances, i. e., within six to eight hours. On continued heating the solution becomes progressively darker until it becomes black. In the presence of iron or iron salts the discoloration ordinarily begins within an hour or less. Solutions stabilized with formamide have been heated in contact with iron for as long as a week with no visible change in color.

The amount of formamide used may vary from about .1 per cent up to 5 per cent or over on the weight of the polymer. Less than .1 per cent may be used, such as, for example, down to 0.05 per cent, although in general somewhat larger amounts, but preferably less than 1 per cent of the formamide, will be employed.

For example, in heating a 20 per cent solution of a soluble copolymer of 35 parts of vinyl chloride and 65 parts of vinylidine chloride in benzene above its decomposition temperature (which is about 50° C.), it was found that the addition of 0.5 part of formamide retarded decomposition and prevented discoloration.

What we claim is:

1. A color stable resin which comprises a polymer of vinyl chloride having incorporated therein from 0.05 to 5 percent (based on the polymer) of formamide.

2. A color stable resin which comprises polyvinyl chloride having incorporated therein from 0.05 to 5 percent (based on the polyvinyl chloride) of formamide.

3. A color stable resin which comprises a copolymer of vinyl chloride and a compound of the group consisting of vinylidene chloride, vinyl acetate, the diesters of maleic acid, the diesters of fumaric acid and the diesters of monochloro maleic acid, said copolymer having incorporated therein from 0.05 to 5 percent (based on the copolymer) of formamide.

4. A color stable resin which comprises a polymer of vinyl chloride having incorporated therein from 0.1 to 1.0 percent (based on the polymer) of formamide.

5. A color stable resin which comprises polyvinyl chloride having incorporated therein from 0.1 to 1.0 percent (based on the polyvinyl chloride) of formamide.

6. A color stable resin which comprises a copolymer of vinyl chloride and a compound of the group consisting of vinylidene chloride, vinyl acetate, the diesters of maleic acid, the diesters of fumaric acid and the diesters of monochloro maleic acid, said copolymer having incorporated therein from 0.1 to 1.0 percent (based on the copolymer) of formamide.

LA VERNE E. CHEYNEY.
CARL R. PARKS.

REFERENCES CITED

The following references are of record in the file of this patent:

UNITED STATES PATENTS

| Number | Name | Date |
|---|---|---|
| 2,103,581 | Gray | Dec. 28, 1937 |